(12) United States Patent
Kikuchi et al.

(10) Patent No.: US 7,479,718 B2
(45) Date of Patent: Jan. 20, 2009

(54) ELECTRIC ROTATING MACHINE

(75) Inventors: Masao Kikuchi, Tokyo (JP); Hitoshi Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/707,036

(22) Filed: Feb. 16, 2007

(65) Prior Publication Data

US 2007/0216240 A1 Sep. 20, 2007

(51) Int. Cl.
 *H02K 11/00* (2006.01)
(52) U.S. Cl. .................................. 310/68 R; 310/68 D
(58) Field of Classification Search ............... 310/68 R, 310/68 D, 86, 89, 68 B
See application file for complete search history.

(56) References Cited

U.S. PATENT DOCUMENTS

| | | | |
|---|---|---|---|
| 5,325,005 A | | 6/1994 | Denk |
| 5,925,951 A | | 7/1999 | Edwards et al. |
| 6,268,669 B1 | | 7/2001 | Wakao et al. |
| 6,313,624 B1 | * | 11/2001 | Alhorn et al. ........... 324/207.17 |
| 6,628,021 B2 | * | 9/2003 | Shinohara et al. ......... 310/68 B |
| 2004/0007926 A1 | * | 1/2004 | Tsukada .................... 310/68 B |
| 2004/0012286 A1 | | 1/2004 | Zens |
| 2004/0232786 A1 | | 11/2004 | Fukazawa et al. |
| 2005/0206253 A1 | | 9/2005 | Hertz et al. |

FOREIGN PATENT DOCUMENTS

| | | | |
|---|---|---|---|
| DE | 41-42-707 C1 | | 1/1993 |
| DE | 100-43-736 A1 | | 3/2001 |
| DE | 101-18-052 A1 | | 10/2002 |
| EP | 0-612-974 A2 | | 8/1994 |
| EP | 0-731-552 A1 | | 9/1996 |
| JP | 1-245101 A | | 9/1989 |
| JP | 7-107695 A | | 4/1995 |
| JP | 9-65617 A | | 3/1997 |
| JP | 10-47994 | * | 2/1998 |
| JP | 11-27903 A | | 1/1999 |

* cited by examiner

*Primary Examiner*—Nguyen N Hanh
(74) *Attorney, Agent, or Firm*—Sughrue Mion, PLLC

(57) ABSTRACT

An electric rotating machine comprises: a stator; a rotor that includes a rotary shaft, and rotates coaxially with the stator; a bracket supporting and fixing the stator, and supporting rotatably the rotary shaft; a rotational position detector disposed on the side opposite to the load of the rotary shaft to detect a rotational position of the rotor; and a power part including a switching element disposed on the outer circumferential side of the rotational position detector. A shield member is disposed at the rotational position detector to cover the circumference and shield a magnetic field generated by the switching element.

8 Claims, 6 Drawing Sheets

FIG.7

| MATERIAL | NOISE LEVEL | | | | | |
|---|---|---|---|---|---|---|
| | CONFIGURATION (0) | CONFIGURATION (1) | CONFIGURATION (2) | CONFIGURATION (3) | CONFIGURATION (4) | CONFIGURATION (5) |
| NO SHIELD MEMBER | 1 | | | | | |
| CONDUCTOR A | | <0.4 | <0.2 | <0.4 | | |
| CONDUCTOR B | | <0.4 | <0.2 | <0.5 | | |
| MAGNETIC SUBSTANCE A | | <0.2 | | | <0.3 | |
| MAGNETIC SUBSTANCE B | | | | | | <0.1 |

ELECTRIC ROTATING MACHINE

BACKGROUND OF THE INVENTION

1. Field of the Invention

The present invention relates to an electric rotating machine such as motor and, more particularly, to a small-sized electric rotating machine that includes a rotational position detector and a switching element part controlling current flowing through the electric rotating machine, and that is suitably mounted occupying a small space such as for use in vehicles.

2. Description of the Related Art

In an electric motor integrated with a control device that is disclosed, for example, in the Japanese Patent Publication (unexamined) No. 27903/1999 (on pages 4-5, FIG. 2), a control device case is fixed to an end bracket or to a housing on the side opposite to the load of an electric motor, and a cooling fan is attached to an end portion on the side opposite to the load of a shaft running through the control device case. The control device case contains an inverter circuit and a positional detector of a rotor that is located on the inner circumferential side of the inverter circuit.

Outputs from the electric motor are adjusted by ON/OFF control of a switching element of the inverter circuit. When operating the switching element, sharp magnetic field change occurs accompanied by the rapid change of currents, and therefore such magnetic field change comes out as electromagnetic noises in other devices or circuits, which may lead to the occurrence of malfunction.

In the electric motor integrated with a control device as disclosed in the above-mentioned Japanese Patent Publication (unexamined) No. 27903/1999, since the inverter circuit part containing the switching element and the rotational position detector of the rotor are disposed in proximity to each other, noises that are generated by the above-mentioned sharp change of magnetic field are superimposed on the output from the rotational position detector. Consequently, a problem exists that the position of the rotor is erroneously detected.

SUMMARY OF THE INVENTION

The present invention was made to solve the problems as mentioned above, and has an object of providing an electric rotating machine in which a rotational position detector is not affected by the external magnetic field, and noises included in the outputs from the rotational position detector are reduced to prevent malfunction of the rotational position detector.

An electric rotating machine according to the invention includes: a stator; a rotor fixed to a rotary shaft that rotates coaxially with the mentioned stator; a bracket that supports and fixes the mentioned stator and that supports the mentioned rotary shaft so as to be capable of rotating; and a rotational position detector that is disposed on one end side of the mentioned rotary shaft to detect a rotational position of the mentioned rotor; and in which a shield member that covers the circumference of the rotational position detector and that shields an external magnetic field is mounted onto the mentioned bracket.

In the electric rotating machine of above construction according to the invention, since there is provided a shield member that covers the circumference of a rotational position detector and that shields the external magnetic field, most of magnetic fields that are generated outside the rotational position detector are absorbed into the shield member, and the magnetic field strength around the rotational position detector comes to be significantly small. Thus, the noises to be superimposed on outputs from the rotational position detector are decreased to such a levels as causing no malfunction of the rotational position detector.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table showing results of measured effects of the shield members.

DESCRIPTION OF THE PREFERRED EMBODIMENTS

Figure 1:
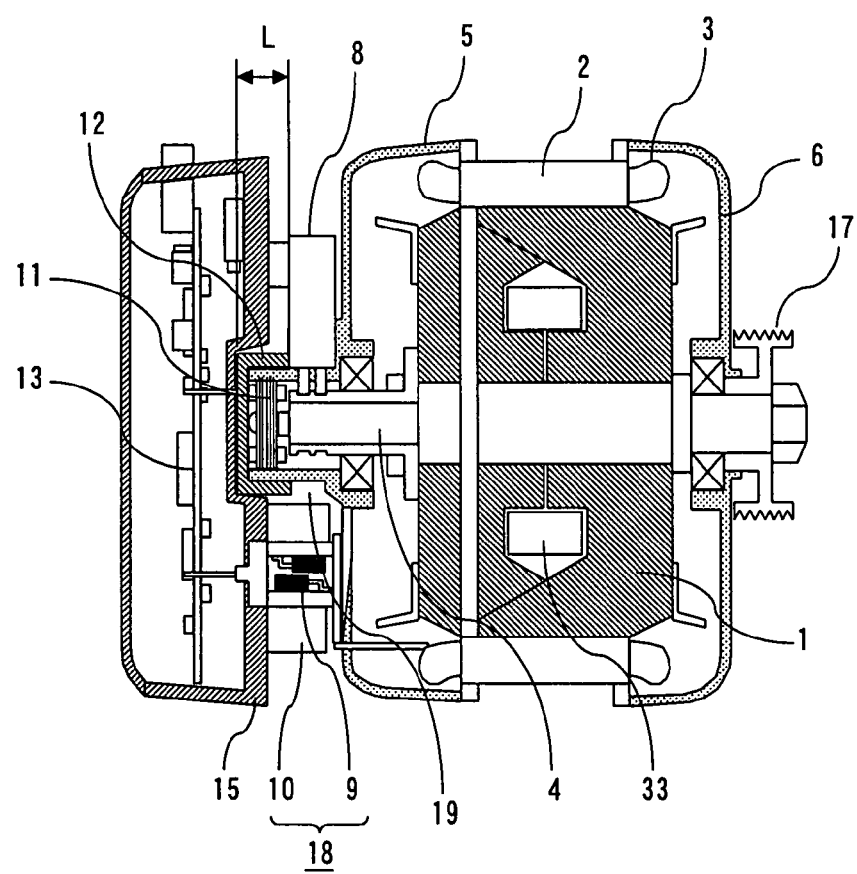
FIG. 1 is a sectional schematic view showing a first preferred embodiment of an electric rotating machine according to the present invention.

Several preferred embodiments according to the present invention are hereinafter described referring to the drawings. The embodiments described hereinafter show as an example the structure of an electric rotating machine integrated with a control device, in which a control device mounted onto the electric rotating machine includes a switching element part for controlling current supplied to windings wound round a stator or a rotor.

Embodiment 1

Figure 2:
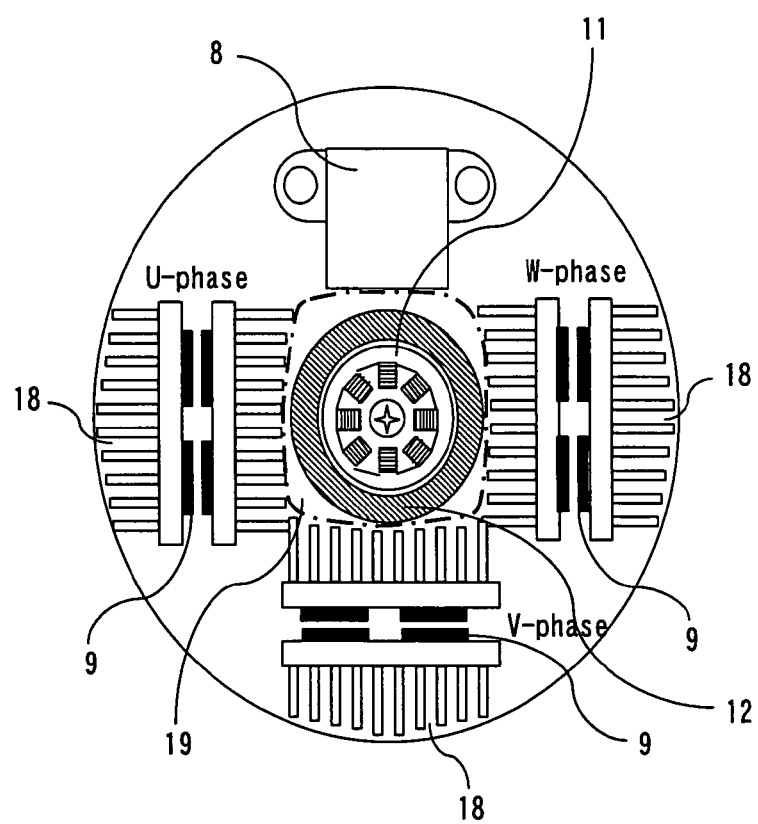
FIG. 2 is a side view taken axially the peripheral portion of a rotational position detector in FIG. 1.

FIG. 1 is a sectional schematic view showing a first embodiment of an electric rotating machine according to the present invention, and FIG. 2 is a side view taken axially the peripheral portion of a rotational position detector. The electric rotating machine according to this first embodiment is provided with a stator 2 supported and fixed to brackets 5 and 6, and a rotor 1 that includes a rotary shaft 4 rotatably supported by the brackets 5 and 6, and that is rotated coaxially with the stator 2. The stator 2 includes a stator winding 3, and the rotor 1 includes a rotor winding 33. A pulley 17 is attached to the load side of the rotary shaft 4, and the pulley 17 is connected to loads not shown. A power part 18 including a switching element 9 and a heat sink 10 is attached to the bracket 5 on the side opposite to the load side. A control circuit part 13 that controls the switching element 9 of the power part 18 is contained in a case 15 attached to the outside (in an opposite direction to the load side) of the power part 18. A rotational position detector 11 is attached to the end on the side opposite to the load side of the rotary shaft 4. A space 19 is formed between the rotational position detector 11 and the power part 18 disposed on the outer circumferential side of the rotational position detector 11. The power part 18 is located concentrically with the rotary shaft 4. In case of an electric rotating machine to be controlled with three-phase AC, for example, as shown in FIG. 2, U-phase, V-phase and W-phase are disposed on both sides of the circumference in a horizontal direction and at the lower portion of the circumference in a vertical direction. Furthermore, in the case of, for example, a field winding-type electric rotating machine, a brush part 8 that carries current through the rotor winding 33 is disposed in the remaining upper space of the circumference in the vertical direction. Owing to such layout, space is effectively utilized, and thus a compact electric rotating machine integrated with a control device can be achieved.

As shown in FIG. 2, the rotational position detector 11 has a substantially concentric contour with the rotary shaft 4. Radially between the rotational position detector 11 and the power part 18, a space 19 of cylindrical shape or nearly prismatic shape with the rotary shaft 4 centered is formed. A shield member 12 having a contour concentric with the rotary shaft 4 is attached in the space 19 so as to cover the outer circumference of the rotational position detector 11.

In this manner, by forming the space 19 and attaching the shield member 12 utilizing the space 19, it is possible to obtain a compact electric rotating machine integrated with a control device.

At the time of making the switching element 9 ON/OFF, the sharp change of magnetic field interlinking with the rotational position detector 11 occurs resulted from the rapid change of current, thus generating noise in the outputs from the rotational position detector 11. The noise is transmitted to the control circuit side as if any rotational position signal, leading to rotational error of the electric rotating machine.

To cope with the occurrence of such sharp change of magnetic field, in this first embodiment, as shown in FIGS. 1 and 2, the shield member 12 is disposed at the space 19 formed between the power part 18 and the rotational position detector 11 to cover the circumference of the rotational position detector 11, so that the noise occurring at the rotational position detector 11 is decreased.

In this case, to improve shield effect, it is preferred that the shield member 12 having an axial length substantially equal to the length L of the rotational position detector 11 shown in FIG. 1 is arranged so as to form a circle around the entire circumference of the rotational position detector 11 as shown in FIG. 2.

Figure 3:
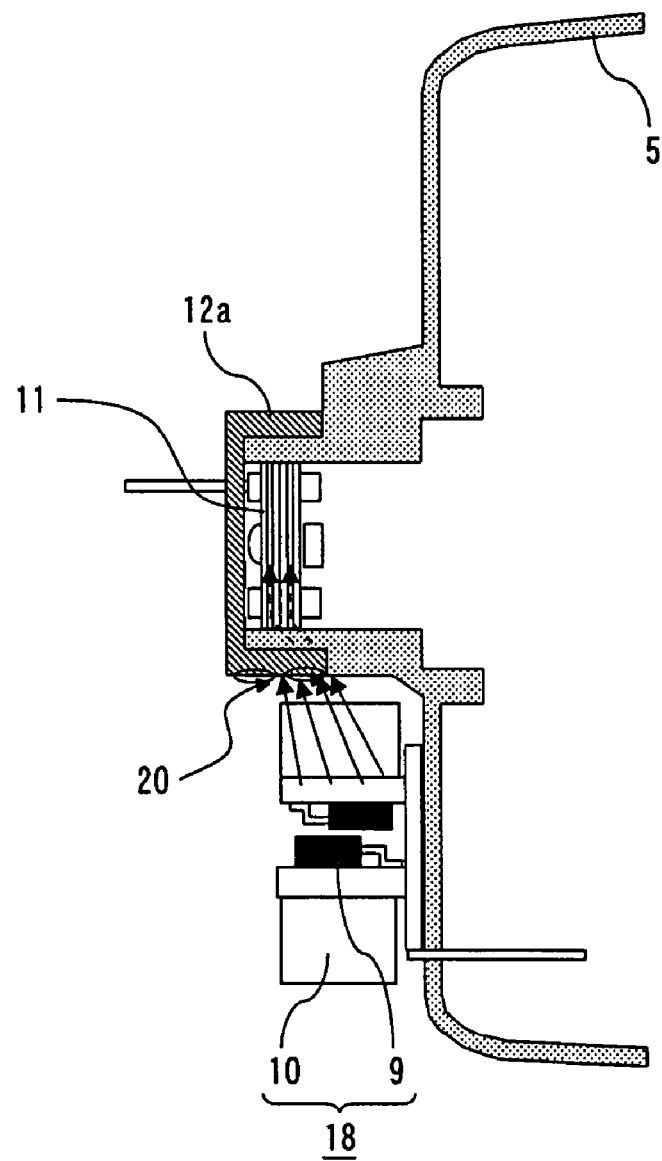
FIG. 3 is an enlarged sectional view of an essential part for explaining effects of a shield member that reduces influences of a power part on the rotational position detector.
Figure 4:
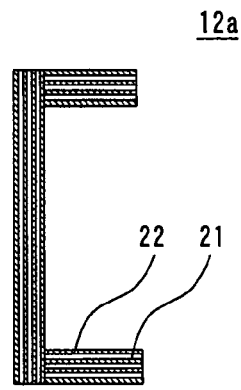
FIG. 4 is a sectional schematic view for explaining a shield member in a laminated structure.
Figure 5:
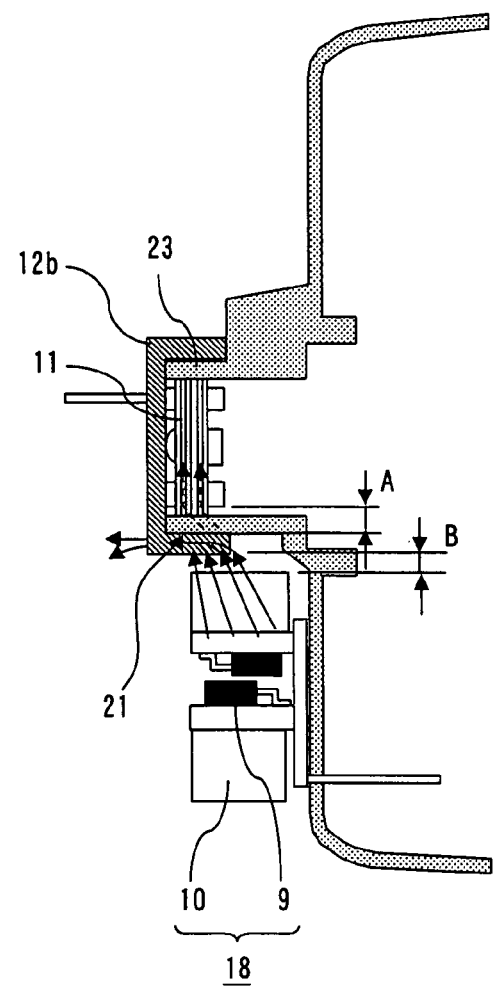
FIG. 5 is an enlarged sectional view of the essential part for explaining effects of a shield member that reduces influences of a power part on the rotational position detector.

FIGS. 3 and 5 are enlarged sectional views of principal portions for explaining effects of the shield member that reduces the influences of the power part 18 on the rotational position detector. FIG. 4 is a sectional view showing an example of a construction of the shield member. FIG. 3 shows a case where the shield member 12a made of a material of high conductivity such as copper or aluminum there is disposed between the power part 18 and the rotational position detector 11.

As shown in FIG. 3, at the shield member 12a, an eddy current 20 is generated in a direction of canceling sharp field change that occurs at the time of making the switching element ON/OFF, and a magnetic field to interlink inside of the shield member 12a is weakened at the rotation position detector 11 (hereinafter, referred to as shield effect). Therefore, it is possible to lower the noise level of the rotational position detector 11. Although the shield member 12a has only to be made of any conductive material, it is preferable to employ a conductive material of as small electrical resistivity as possible; for example, copper or other materials whose main component is copper will have a large shield effect. Furthermore, aluminum or other materials whose main component is aluminum can also have an advantage of weight saving in addition to the shield effect. Additionally, in case of an integrated construction of the shield member 12a and the bracket 5, it is possible to reduce mounting members for attaching the shield member 12a to the bracket 5.

Moreover, as shown in FIG. 4, a shield member 12a that is manufactured by winding alternately a conductor 22 made of conductive materials and an insulating layer 21 made of insulating materials forming multiple layers can be expected to have a shield effect with eddy current in the vicinity of the surface of the conductor 22, resulting in a still further shield effect. In this case, the insulating layer 21 may be a sheet made of resin, an adhesive layer and the like, or may be a coating layer, a vapor deposited layer and the like formed on the conductor 22. Furthermore, in practical use, oxide layers to be formed on the surface of the conductor layer 22 made of, e.g., aluminum or copper may be used on condition of having a thickness for exhibiting sufficient insulating properties. It is preferable that materials formed with these oxide layers are wound to be multiple-layered.

FIG. 5 shows a case where a non-magnetic layer 23 such as copper or aluminum is mounted on between the power part 18 and the rotational position detector 11, and a magnetic shield member 12b of a small magnetic resistance such as soft magnetic ferrite is mounted on the circumference of the non-magnetic layer 23. Since the magnetic shield member 12b has a remarkably small magnetic resistance as compared with the non-magnetic layer 23, a magnetic flux that is generated from the power part 18 positioned radially outside of the electric rotating machine is not leaked to the rotational position detector 11, but dissipated to the outside through the magnetic shield member 12b. It is preferable that the non-magnetic layer 23 is an air layer (that is, space). By forming an air layer as the non-magnetic layer 23, it is possible to reduce the number of parts.

In this case, the relation between the shield member 12b, the rotational position detector 11, and the power part 18 is important for the effect of noise reduction. That is, in the relation between the distance between the shield member 12b and the rotational position detector 11 (distance A in FIG. 5) and the distance between the shield member 12b and the power part 18 (distance B in FIG. 5), it is preferable that the distance A is relatively larger than B to the extent possible. Due to distance A>distance B, any magnetic field changed at the time of switching is likely to pass through the shield member 12b, and the changed magnetic field is not leaked from the shield member 12b to the rotational position detector 11, a still larger shield effect can be obtained.

Embodiment 2

Figure 6:
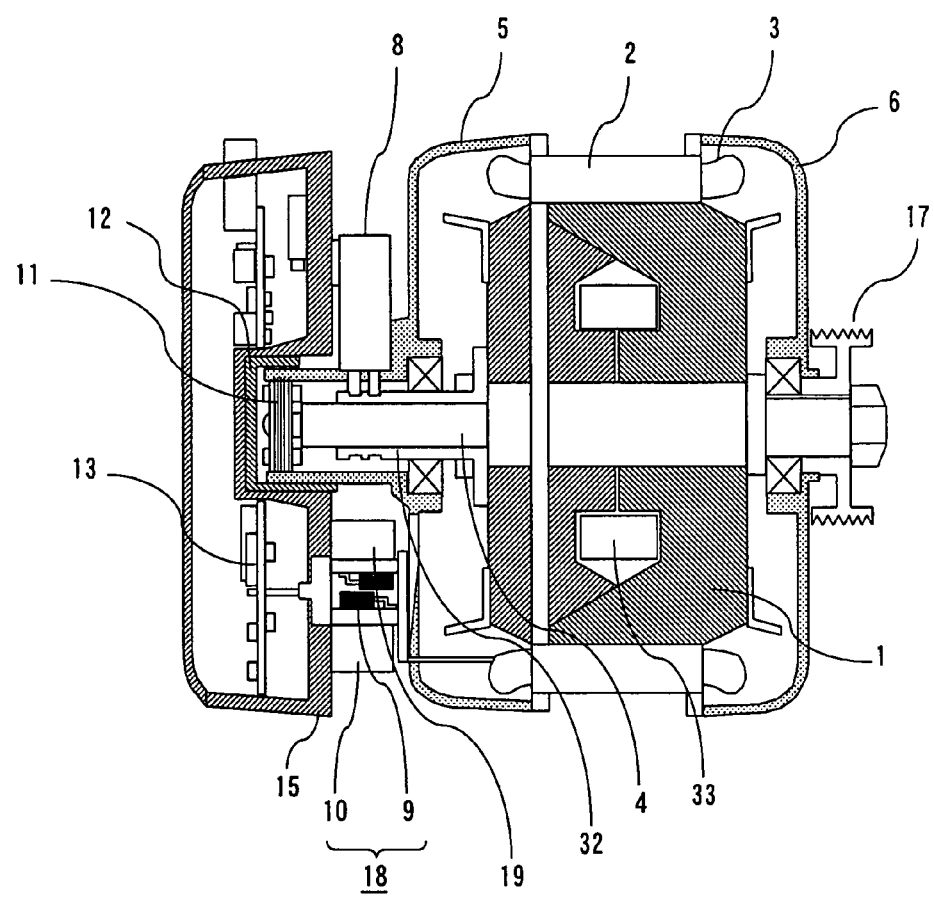
FIG. 6 is a sectional schematic view showing a second embodiment of the electric rotating machine according to the invention.

FIG. 6 is a sectional schematic view showing a second embodiment of the electric rotating machine according to the present invention. Being different from the foregoing first embodiment, the rotational position detector 11 and the power part 18 are disposed spaced apart in an axial direction of the rotary shaft 4. When the power part 18 and the rotational position detector 11 are located axially spaced apart, since the magnetic field to be generated by the power part 18 is attenuated, noise can be reduced further.

Furthermore, in the case of a field winding-type AC electric rotating machine, since the brush 8 for carrying current through the rotor winding 33 is mounted so as to be in contact with a slip ring 32 of the rotary shaft 4, the shield member 12 cannot be disposed at the brush part 8. In this case, however, as shown in FIG. 6, by arranging the rotational position detector 11 with a shift in a direction opposite to the load side in an axial direction of the rotary shaft 4 to avoid the brush part 8, the shield member 12 can be mounted so as to form a circle around the entire circumference of the rotational position detector 11.

In addition, by disposing the power part 18 substantially in the same position as that of the brush part 8 in an axial direction of the rotary shaft 4, compact storage can be improved, and the power part 18 and the rotational position detector 11 can be axially spaced apart without being especially large-sized.

EXAMPLES

FIG. 7 shows results of comparing noise levels in output signals from the rotational position detector 11 in cases where the shield members 12 are constructed with different configurations and materials, and these shield members 12 of various constructions are used. The rotational position detector 11 according to the embodiments is made of a member such as a gear in which a winding is mounted onto a core of a magnetic substance. Further, the rotational position detector 11 is a resolver that is attached to the rotary shaft of the rotor and that detects rotational positions from voltage changes taking place at the winding mounted on the core due to magnetic changes caused by the rotation of the rotor.

With reference to FIG. 7, a conductor A is copper, a conductor B is aluminum, a magnetic substance A is soft magnetic ferrite, and a magnetic substance B is iron-based soft magnetic substance in which an insulating layer is formed on the surface of a thin plate.

Configuration (0) is the case where no shield member exists.

Configuration (1) is the case where only the circumference of the rotational position detector 11 is covered with one layer of the shield member 12 made of a conductor A, a conductor B, and a magnetic substance A.

Configuration (2) is the case where one layer of the shield member 12 made of a conductor A and a conductor B is formed axially from the rotational position detector 11 to the power part 18.

Configuration (3) is the case where an opening is provided at the brush part 8 with respect to configuration (2).

Configuration (4) is the case where only the circumference of the rotational position detector 11 is wound with three layers of the shield member 12 that is made of a thin plate of the conductor A and an insulator so as to be in the same thickness as in the case of configuration (1).

Configuration (5) is the case where only the circumference of the rotational position detector 11 is wound with ten layers of the shield member 12 made of a magnetic substance B so as to be in the same thickness as in the case of configuration (1).

In any case (configuration (1) to (5)), it was acknowledged that as compared with the case of no shield member (configuration (0)), noise level was reduced. In particular, configuration (4) had a large effect as compared with configuration (1), and the shield member 12 made of a thin plate of conductor A and an insulator was found to be effective for noise reduction. Furthermore, as in configuration (5), in the case where the magnetic material of superior high frequency characteristics containing iron is laminated, as compared with the case with no shield member 12, noise was found reduced to not more than 1/10. In particular, iron-based amorphous alloys and other magnetic substances of superior magnetic shield effect are easy to industrially manufacture as sheet-like materials. By those sheet-like materials being wound and laminated, it is possible to manufacture shield members having an extremely high shield effect. Particularly, a resolver detecting the change of magnetic field going through the winding is sensitive to the influence caused by the change of external magnetic field. As shown in the results of FIG. 7, however, provision of any shield member 12 was found to be highly effective for reducing noise level.

FIG. 7 shows results of using a shield member made of a conductor or a shield member made of magnetic substance alone. However, even if the conductor and magnetic substance are used in combination, a similar shield effect is exhibited. In the case of the magnetic substance of superior magnetic shield effect that is manufactured in sheet form, by winding a sheet-like magnetic substance on the surface of a sheet of conductor such as copper or aluminum in an overlapping manner, it is possible to achieve a good shield effect without using much shield member made of expensive magnetic substance.

In the above-described first and second embodiments, the case where an external magnetic field is generated from the switching element 9 is described. However, by providing the shield member 12 so as to cover the circumference of the rotational position detector 11, for example, a shield effect is exhibited also with respect to external magnetic field generated outside of the electric rotating machine, thus enabling to reduce noise level of the rotational position detector 11.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An electric rotating machine comprising:
   a stator;
   a rotor fixed to a rotary shaft that rotates coaxially with said stator;
   a stator winding mounted on said stator;
   a rotor winding mounted on said rotor;
   a bracket that supports and fixes said stator and that supports said rotary shaft so as to be capable of rotating;
   a rotational position detector that is disposed on one end side of said rotary shaft to detect a rotational position of said rotor;
   a shield member, that covers the circumference of the rotational positional detector and that shields an external magnetic field, mounted onto said bracket; and
   a switching element part, that controls current to be supplied to sail stator winding or said rotor winding, disposed outside of said shield member and mounted onto said bracket;
   wherein said switching element part generates said external magnetic field.

2. The electric rotating machine according to claim 1, wherein said rotational position detector and said switching element part are disposed axially spaced apart.

3. The electric rotating machine according to claim 1, wherein a substantially cylindrical or a substantially prismatic space is formed with said rotary shaft centered between said rotational position detector and said switching element part; and said shield member is disposed in said space.

4. The electric rotating machine according to claim 1, wherein said shield member is formed in a ring configuration so as to cover the entire circumference of said rotational position detector.

5. The electric rotating machine according to claim 1, wherein said shield member has a structure in which a conductive material and an insulating material are radially laminated.

6. The electric rotating machine according to claim 1, wherein said shield member is made of a soft magnetic substance, and mounted via a non-magnetic part on the inner circumferential side.

7. The electric rotating machine according to claim 1, wherein said shield member is formed of a laminate of an iron-based soft magnetic substance in which an insulating layer is formed on the surface of a thin plate.

8. An electric rotating machine comprising: a stator; a rotor fixed to a rotary shaft that rotates coaxially with said stator; a bracket that supports and fixes said stator and that supports said rotary shaft so as to be capable of rotating; and a rotational position detector that is disposed on one end side of said rotary shaft to detect a rotational position of said rotor;

wherein a shield member that covers the circumference of the rotational positional detector and that shields an external magnetic field is mounted onto said bracket;

wherein a winding is mounted on said stator; a switching element part that controls current to be supplied to said winding is disposed outside of said shield member; and said switching element part generates said external magnetic field; and wherein a substantially cylindrical or a substantially prismatic space is formed with said rotary shaft centered between said rotational position detector and said switching element part; and said shield member is disposed in said space.

* * * * *